M. STOLTS.
VEGETABLE HARVESTER.
APPLICATION FILED FEB. 9, 1911.
1,016,976.
Patented Feb. 13, 1912.
2 SHEETS—SHEET 1.
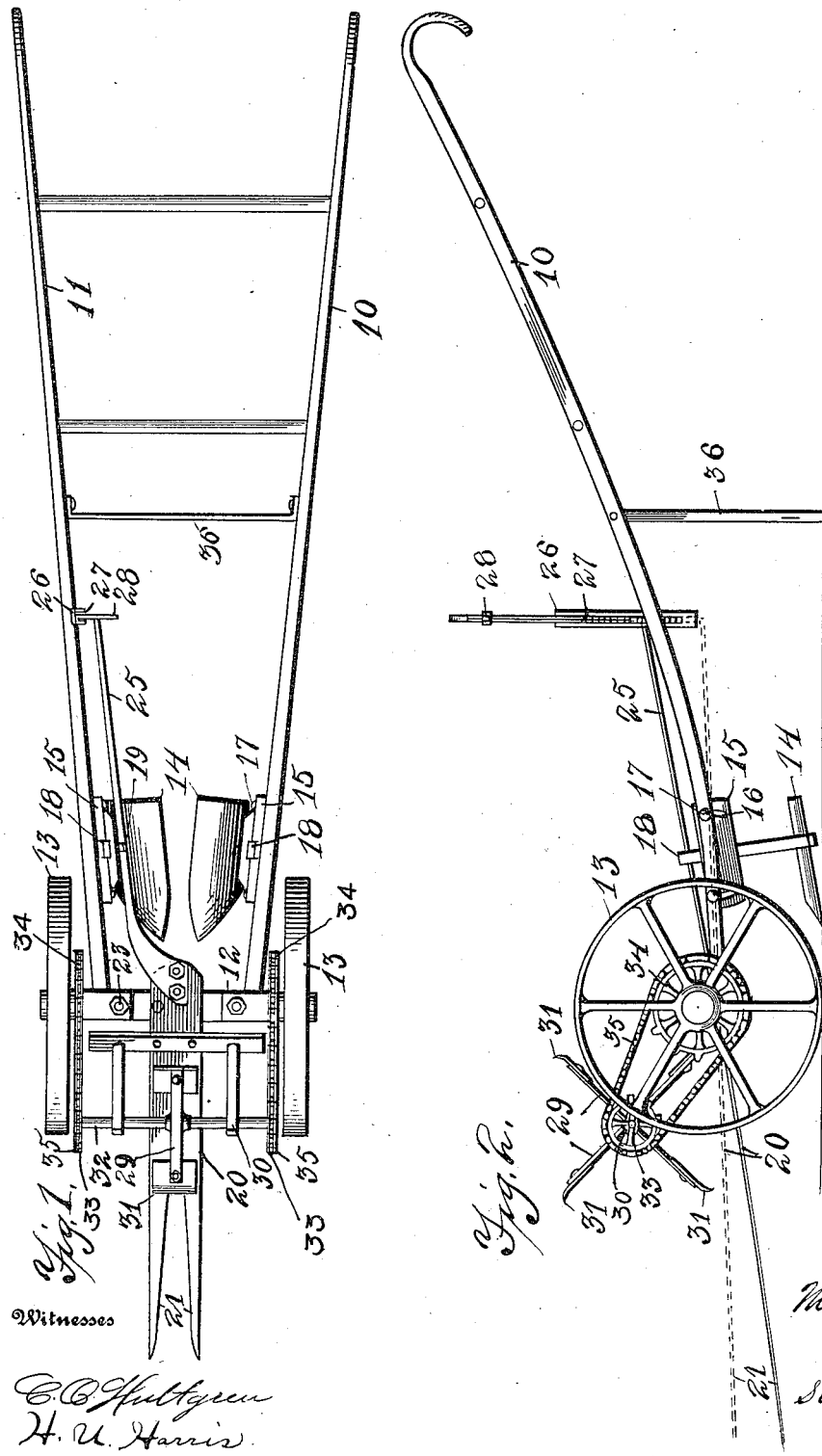

M. STOLTS.
VEGETABLE HARVESTER.
APPLICATION FILED FEB. 9, 1911.
1,016,976.
Patented Feb. 13, 1912.
2 SHEETS—SHEET 2.
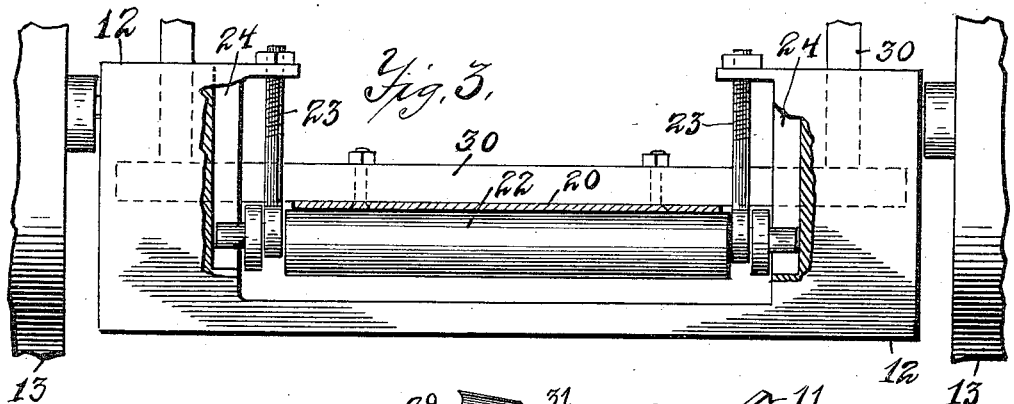
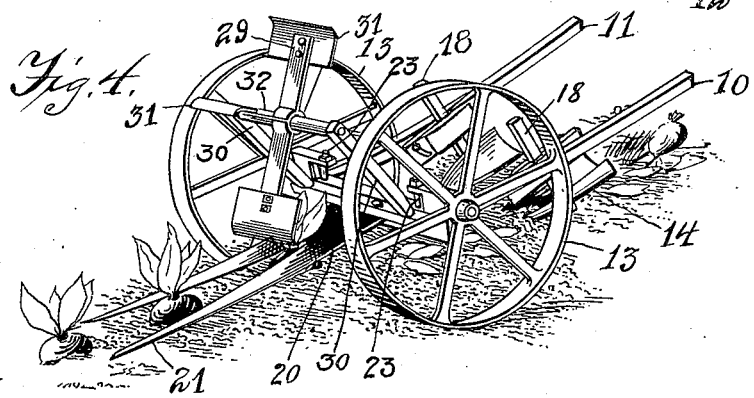
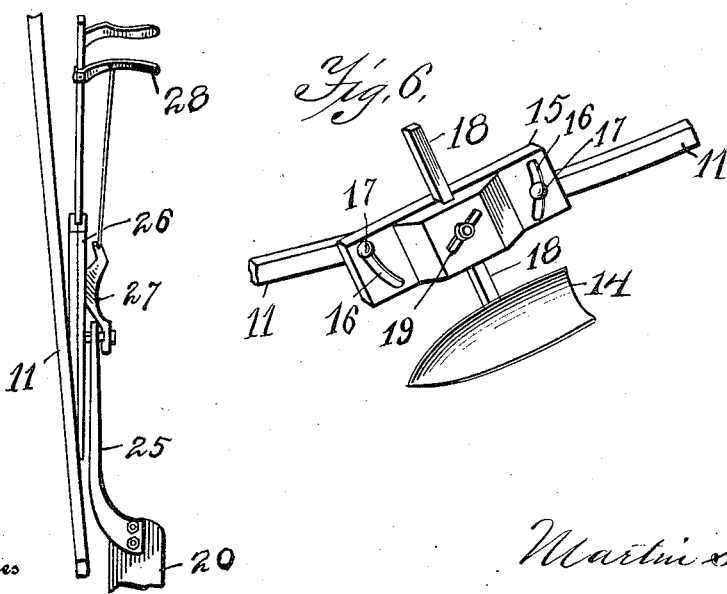

UNITED STATES PATENT OFFICE.

MARTIN STOLTS, OF SOUTH DAYTON, NEW YORK.

VEGETABLE-HARVESTER.

1,016,976.   Specification of Letters Patent.   Patented Feb. 13, 1912.

Application filed February 9, 1911. Serial No. 607,532.

*To all whom it may concern:*

Be it known that I, MARTIN STOLTS, a citizen of the United States, residing at South Dayton, in the county of Cattaraugus and State of New York, have invented new and useful Improvements in Vegetable-Harvesters, of which the following, taken in connection with the accompanying drawings, is a specification.

The invention relates to harvesters for beets, onions, and similar vegetables which have to be topped in preparing them for the market; and the objects of my invention are, first, to provide novel mechanism which insures the cutting of the tops from the vegetables at the point desired; and second to provide means for digging the vegetables; and the invention consists in the construction and arrangement of the parts as shown in this specification and the accompanying drawings and pointed out in the claims.

In the drawing Figure 1 is a plan view of the harvester showing the arrangement and construction of the same; and Fig. 2 is a side elevation of the same. Fig. 3 is a rear elevation of the axle showing a sectional view of the knife, a portion of the wheels being broken away. Fig. 4 is a perspective view of the front portion of the machine without the sprocket wheels and chains, showing the knives cutting the tops from beets and showing the beets as dug by the shovels. Fig. 5 is a side elevation of the ratchet lever for adjusting the angle of the knives. Fig. 6 is a detail elevation of one of the digging shovels showing its adjustable attachment to the frame and the means for adjusting the angle of the shovel.

Like numerals refer to corresponding parts in the several views.

The harvester is especially adapted for manual use in harvesting garden vegetables where draft animals cannot be used. The harvester is therefore arranged to be pushed by the operator.

The numeral 10 indicates one of the harvester handles and the numeral 11 the other. The handles 10 and 11 are formed like plow handles with the exception of a downward curve near their lower ends and are attached at said lower ends to the axle 12. The wheels 13 have broad tires and are revolubly mounted on axle 12. The digging shovels 14 are provided below and between the lower ends of the handles 10 and 11. Each shovel 14 is adjustably attached to its handle by means of a plate 15 which has the adjusting slots 16 therein, preferably at each end. Plate 15 is adjustably attached to the handle by means of suitable set screws 17, through slots 16. This arrangement permits the adjusting of the plate 15 at different angles. The shovel 14 is supported in plate 15 by means of a bar 18, to the lower end of which the shovel 14 is attached. The bar 18 is adjusted in plate 15 by means of a suitable set screw 19. It is apparent that with this arrangement the shovel 14 may be tipped at an angle so as to dig beneath the vegetable. The front end of each of the shovels 14 is preferably pointed. Said shovels are attached on the inturned lower ends of bars 18 so that when properly adjusted their inner edges are a slight distance apart and at about the same angle of inclination.

The cutting of the tops of the vegetables is accomplished by means of a forked or V-shaped knife, 20, which extends out in front of axle 12, the tines 21 of the knife 20 extending out each side of the vegetable tops and gathering them into the forked opening as the harvester moves along. Knife 20 is adjustably mounted in axle 12 on a cross bar 22. Cross bar 22 is supported on bolts 23 at each side of knife 20. The ends of cross bar 22 extend into vertical grooves 24 within the axle 12 so that by means of suitable nuts on bolts 23 and cross bar 22 the knife 20 may be raised or lowered as desired. Cross bar 22 is pivotally mounted on the lower ends of bolts 23 so that the knife 20 and bar 22 to which it is attached may be turned at any desired angle, thereby lowering or raising the tines 21 in relation to cross bar 22. In order to control said raising and lowering of the tines 21 an extension 25 projects from the rear end of knife 20 and is attached to the lower end of a ratchet lever 26. A strong ratchet 27 is provided on lever 26 which is manually operated by means of the hand lever 28 so that the ratchet 27 may be released from the ratchet lever bar and moved up or down and secured as desired, thereby holding the knife 20 at the desired angle and changing the angle of same with ease as the operator desires.

The tops of beets and onions are bent easily and must be held firmly in order to cut them squarely so as to look well when placed on sale in the market. Accordingly a reel 29 is mounted on a rack 30, which rack is attached to knife 20 just in front of axle 12. The support of frame 30 on knife 20 insures the reel 29 moving with knife 20 so that it never gets out of adjustment with the same. The knives 31 are provided on the outer ends of the arms of the reel 29 and thus form a reel shaped knife. Knives 31 are preferably curved on their outer edges in one direction so as to cut the vegetable tops in conjuction with forked knife 20. The reel 29 is mounted on cross shaft 32 which is revolubly mounted on frame 30 and has the sprocket wheels 33 attached to its outer end. Sprocket wheels 34 are provided on wheels 13 to turn therewith and chains 35 connect the sprocket wheels 33 and 34. The shaft 32 and frame 30 are so adjusted as to knife 20 that the knives 31 on the reel 29 will just contact with the knife 20 at the bottom of its V-shaped opening, thereby forcing the vegetable tops into the said V-shaped opening and easily cutting the same.

It is apparent that the sprocket chains 35 on the sprocket wheels will turn the reel 29 when the harvester is pushed over the ground, the turning of the wheels 13 accomplishing the turning of the wheel 33. A supporting frame 36 is preferably provided beneath the handles 10 and 11.

I claim as new:

1. In a vegetable harvester, a V-shaped knife, a reel mounted on said knife and means for turning said reel, knives on said reel to cut in conjunction with said V-shaped knife, and a ratchet for raising and lowering the tines of said V-shaped knife.

2. In a vegetable harvester, a carriage and means for propelling the same, a V-shaped knife supported on said carriage, a ratchet for adjusting said knife, a frame mounted on said knife, a reel-shaped knife revolubly mounted on said frame to cut in conjunction with said V-shaped knife, and sprocket chains geared to said carriage for turning said reel.

3. In a vegetable harvester, a carriage comprising an axle and wheels revolubly mounted on said axle, handles attached to said axle for propelling said carriage, a V-shaped knife adjustably supported on said axle and extending in front of said axle, a ratchet for adjusting said V-shaped knife, a reel revolubly mounted on said V-shaped knife, knives on said reel cutting in conjunction with said V-shaped knife when rotated, and sprocket chains and wheels connecting said reel and carriage wheels to rotate said reel when said carriage is moved forward, substantially as and for the purpose specified.

4. In a vegetable harvester, a carriage, means for propelling the same, a V-shaped knife supported on said carriage, a ratchet for adjusting said knife, a frame mounted on said knife, a reel revolubly mounted on said frame, knives on said reel cutting in conjunction with said V-shaped knife when rotated, and means on said carriage for digging the vegetables.

5. In a vegetable harvester, a carriage comprising an axle and wheels revolubly mounted on said axle, handles attached to said axle for propelling said carriage, a V-shaped knife adjustably supported on said axle and extending in front of said axle, a ratchet for adjusting the angle of said V-shaped knife, a reel revolubly mounted on said V-shaped knife, knives on said reel cutting in conjunction with said V-shaped knife when rotated, sprocket chains and wheels connecting said reel and carriage wheels to rotate said reel when said carriage is moved forward, and shovels adjustably mounted on said handles as to their angle of inclination for digging the vegetables, substantially as and for the purpose specified.

In testimony whereof I have signed my name to this specification in the presence of two subscribing witnesses.

MARTIN STOLTS.

Witnesses:
  JOHN KELLOGG,
  CHAS. STOLTS.

---

Copies of this patent may be obtained for five cents each, by addressing the "Commissioner of Patents, Washington, D. C."